United States Patent
Giesseler (10) Patent No.: US 9,274,523 B2
(45) Date of Patent: Mar. 1, 2016

(54) AIRCRAFT WITH A DEVICE FOR DIRECTIONALLY STABILIZING THE AIRCRAFT, COMPUTER PROGRAM PRODUCT AND METHOD FOR DIRECTIONALLY STABILIZING THE AIRCRAFT

(75) Inventor: Hans-Gerd Giesseler, Halstenbek (DE)

(73) Assignee: Airbus Operations GmbH, Hamburg (DE)

( * ) Notice: Subject to any disclaimer, the term of this patent is extended or adjusted under 35 U.S.C. 154(b) by 978 days.

(21) Appl. No.: 13/464,029

(22) Filed: May 4, 2012

(65) Prior Publication Data

US 2012/0325977 A1    Dec. 27, 2012

Related U.S. Application Data

(60) Provisional application No. 61/482,286, filed on May 4, 2011.

(51) Int. Cl.

| | |
|---|---|
| *B64C 13/16* | (2006.01) |
| *G05D 1/08* | (2006.01) |
| *G05D 1/00* | (2006.01) |
| *B64C 13/18* | (2006.01) |
| *B64C 13/50* | (2006.01) |

(52) U.S. Cl.
CPC ............... *G05D 1/0066* (2013.01); *B64C 13/18* (2013.01); *B64C 13/503* (2013.01); *G05D 1/0816* (2013.01)

(58) Field of Classification Search
CPC . G05D 1/0066; G05D 1/0204; G05D 1/0816; B64C 13/16; B64C 13/18
See application file for complete search history.

(56) References Cited

U.S. PATENT DOCUMENTS

| | | | |
|---|---|---|---|
| 5,375,793 A | * | 12/1994 | Rivron ...................... B64C 9/12 244/184 |
| 5,590,853 A | | 1/1997 | Greene |
| 6,002,349 A | | 12/1999 | Greene |
| 6,241,183 B1 | | 6/2001 | Mathieu |

(Continued)

FOREIGN PATENT DOCUMENTS

| | | |
|---|---|---|
| DE | 10 2004 029 194 | 1/2006 |
| DE | 10 2009 013 758 | 9/2010 |
| DE | 10 2011 100 481 | 11/2012 |

(Continued)

OTHER PUBLICATIONS

European Search Report for Application No. 12 00 3422 dated Sep. 18, 2013.

(Continued)

*Primary Examiner* — Brian M O'Hara
(74) *Attorney, Agent, or Firm* — Jenkins, Wilson, Taylor & Hunt, P.A.

(57) ABSTRACT

A method for reducing yawing motions of an aircraft in-flight, wherein a spoiler adjustment drive of a spoiler and a regulating flap adjustment drive of a regulating flap of the same respective airfoil are adjusted in a time segment in such a way that the motion of the spoiler being adjusted and the motion of the regulating flap of the same airfoil deflect in mutually opposite directions in the time segment. The spoiler and the regulating flap are adjusted on the airfoil, on which the adjusted deflections counteract the respectively occurring yawing motion. Also provided are a computer program product for carrying out this method and an aircraft with a directional stabilization device for carrying out this method.

16 Claims, 2 Drawing Sheets

(56) References Cited

U.S. PATENT DOCUMENTS

2003/0230677 A1 12/2003 Milliere
2006/0284022 A1 12/2006 Harrigan et al.

FOREIGN PATENT DOCUMENTS

EP 0 262 702 4/1988
EP 0 293 018 11/1988
EP 0 742 142 11/1996
EP 2 741 396 6/2014
WO WO 2011/0009918 1/2011

OTHER PUBLICATIONS

German Office Action for Application No. DE 10 2011 100 481.9 dated May 27, 2014.
International Search Report for Application Serial No. WO 2011/0009918 dated Nov. 2, 2010.

* cited by examiner

AIRCRAFT WITH A DEVICE FOR DIRECTIONALLY STABILIZING THE AIRCRAFT, COMPUTER PROGRAM PRODUCT AND METHOD FOR DIRECTIONALLY STABILIZING THE AIRCRAFT

CROSS-REFERENCE TO RELATED APPLICATIONS

The present application claims priority from German Application DE 10 2011 100 481.9, filed on May 4, 2011, and claims the benefit of U.S. Provisional application 61/482,286, filed on May 4, 2011, each of which is hereby incorporated in its entirety by reference.

FIELD OF THE INVENTION

The invention pertains to an aircraft with a device for directionally stabilizing the aircraft, a computer program product and a method for directionally stabilizing the aircraft.

BACKGROUND

In order to influence the flight attitude of an aircraft, it is known from the general prior art to utilize conventional control flaps for moderating occurring deviations of the flight attitude from the respective flight attitude that corresponds to the specified control parameters.

WO 2011/009918 A1 discloses a method for generating a pilot warning signal when an induced Dutch roll is detected.

SUMMARY

Various embodiments of the invention provide a method for influencing the directional stability of an aircraft, a computer program product for carrying out this method and an aircraft with a device for directionally stabilizing the aircraft, by means of which the respective directional stability can be effectively sought or achieved with comparatively little effort with respect to construction and system technology.

During the actuation of flaps for compensating occurring deviations of the flight attitude from the respective flight attitude that corresponds to the specified control parameters, couplings of forces and/or moments (coupling derivatives) occur and also need to be compensated with actuations of control flaps. The solution compensates yawing motions that were identified as to be avoided such that, in particular, Dutch-Roll damping is achieved.

In various embodiments of the method, the rudder may remain switched into the active state while carrying out the method such that the pilot can also actuate the rudder while the method is carried out.

In accordance with various embodiments of the invention, a method for influencing the directional stability of an aircraft and, in particular, a method for reducing yawing motions of an aircraft in-flight is proposed, wherein a spoiler adjustment drive of a spoiler and a regulating flap adjustment drive of a regulating flap of the same respective airfoil are adjusted in a time segment in such a way that the motion of the spoiler being adjusted and the motion of the regulating flap of the same airfoil deflect in mutually opposite directions in the time segment, and wherein the spoiler and the regulating flap are adjusted on the airfoil, on which the adjusted deflections counteract the respectively occurring yawing motion.

The method may feature, in particular, the following steps:
comparing the characteristics of yawing motions of the aircraft with target specifications in order to identify at least one predetermined characteristic of the yaw oscillations and identification of the predetermined characteristic, and
adjusting the spoiler adjustment drive of a spoiler and the regulating flap adjustment drive of a regulating flap of the same respective airfoil based on the identification of the predetermined characteristic in such a way that the motion of the spoiler being adjusted and the motion of the regulating flap of the same airfoil deflect in mutually opposite directions in the time segment.

Further embodiments of the invention provide a method for influencing the directional stability of an aircraft, wherein the method is implemented in-flight by means of a flight control device, on which an input of control specifications for the flight path control of the aircraft, particularly of lateral control commands for actuating a rudder of the aircraft, takes place. In this case, the following steps are carried out, in particular, in order to achieve Dutch roll damping:
comparing the characteristics of the detected yaw oscillations with target specifications, particularly on the basis of detected yaw rates, in order to identify or recognize at least one predetermined characteristic of the yawing motions and, optionally, generating a logical yawing motion confirmation signal or yaw movement confirmation signal upon identification or recognition of the predetermined characteristic of the yawing motions, and
generating an actuating command for a spoiler adjustment drive of at least one spoiler of the aircraft for the deflection thereof, as well as transmitting said command to the spoiler adjustment drive, and an actuating command for the regulating flap adjustment drive of at least one regulating flap of the aircraft for the deflection thereof, as well as transmitting said command to the regulating flap adjustment drive, namely based on the identification of the predetermined characteristic or based on the generated logical yawing motion confirmation signal, wherein the actuating commands are specified such that the yaw oscillation of the aircraft is reduced.

In this case, it would be possible, in particular, that an adjustment of a spoiler adjustment drive of a spoiler and of a regulating flap adjustment drive of a regulating flap of the same respective airfoil takes place in a time segment based on the identification of the predetermined characteristic or based on the generated logical yawing motion confirmation signal in such a way that the motion of the spoiler being adjusted and the motion of the regulating flap of the same airfoil deflect in mutually opposite directions in the time segment, wherein the spoiler and the regulating flap are adjusted on the airfoil, on which the adjusted deflections counteract the yawing motion and, in particular, the yaw rate of the aircraft with the identified characteristic.

In this case, it is proposed, in particular, that the spoiler adjustment drive and the regulating flap adjustment drive are actuated by the control system in addition to the adjustment drive for the rudder of the aircraft.

Due to the method, the damping of the side slipping oscillation, in particular, is increased by means of wing control surfaces, i.e., the spoiler and the regulating flap, wherein the direction of the deflecting motion of the spoiler extends opposite to the direction of the deflecting motion of the regulating flap at least in a time segment. It is particularly advantageous that the method reduces or eliminates the side slipping oscillation or unfavorable yaw oscillation in a situation, in which the rudder is actually effective, but unfavorably actuated due to unfavorable pilot inputs such that an side slipping oscillation or an unfavorable yaw oscillation of the aircraft is produced, by actuating the spoiler and the regulating flap counteractive to these inputs by means of the flight control device.

In an embodiment of the method, it is proposed, in particular, to realize the yaw oscillation damping function such that the predetermined characteristic of the respectively detected yawing motion or yaw oscillation is defined by a predetermined limiting value of a detected yaw rate of the side slipping oscillation, and that the comparison function identifies the predetermined characteristic of the yawing motion and, in particular, generates a logical yawing motion confirmation signal if it determines that the detected yaw rate exceeds the predetermined limiting value, wherein it is proposed, in particular, that the limiting value amounts to more than 3 degrees per second.

In an embodiment of the method, it is proposed, in particular, to realize the Dutch roll damping function such that the predetermined characteristic of the respectively detected yawing motion or side slipping oscillation is defined by a predetermined limiting value for the respectively detected yaw rate and a limiting value for the minimum time period of an exceedance of the limiting value by the yaw rate in one respective direction, and that the comparison function identifies the predetermined characteristic of the yawing motion and, in particular, generates a logical yawing motion confirmation signal if it determines that the detected yaw rate exceeds the predetermined limiting value for the yaw rate and the predetermined limiting value for the time period, wherein it is proposed, in particular, that the limiting value amounts to more than 3 degrees per second and the limiting value for the minimum time period amounts to more than one second.

In an embodiment of the method, it is proposed to realize the adjustment function in such a way that, in the presence of the logical yawing motion confirmation signal or the yaw rate confirmation signal, it determines at least one actuating command for the spoiler adjustment drive and at least one actuating command for the regulating flap adjustment drive with respect to its magnitude and its time history in dependence on the respectively detected yaw rate and/or the time period of the exceedance of the limiting value by the yaw rate, wherein particularly the at least one actuating command of the adjustment function is defined with respect to its time for the spoiler adjustment drive and the regulating flap adjustment drive in such a way that the adjustment of the spoiler adjustment drive and the regulating flap adjustment drive respectively takes place during the adjustment of the at least one detected yawing motion or yaw oscillation in order to compensate the respectively occurring yawing motion, particularly in one respective yaw oscillation direction, and is realized in such a way that the deflection of the spoiler being adjusted and of the regulating flap aerodynamically counteracts the respective direction of the yawing motion or side slipping oscillation such that the adjusted deflections counteract the yawing motion and, in particular, the yaw rate of the aircraft with the identified characteristic.

According to another embodiment of the invention, the predetermined characteristic is defined in such a way that the following function is fulfilled:

$$\sqrt{\left(\frac{\omega_x}{B_x}\right)^2 + \left(\frac{\omega_z}{B_z}\right)^2} > 1;$$

wherein:
$\omega_z$ is the current yaw rate of the aircraft,
$\omega_x$ is the current roll rate of the aircraft,
$B_x$ is a scaling factor for the current yaw rate $w_x$ of the aircraft that lies in the range between 10 degrees/second and 20 degrees/second, and
$B_z$ is a scaling factor for the current roll rate $w_z$ of the aircraft that lies in the range between 10 degrees/second and 20 degrees/second.

In an embodiment of the method, at least one predetermined characteristic of yaw oscillation is identified or recognized when the preceding function is fulfilled.

According to an embodiment of the method, the predetermined characteristic of the yawing motion may, in particular, be defined by a plurality of the aforementioned characteristics or conditions and the characteristic of the yawing motion may be identified when a plurality of the aforementioned characteristics is fulfilled.

According to another embodiment of the invention, the actuating motion deflection of the spoiler and of the regulating flap is determined as a function of the yaw rate and at least one of the following flight attitude variables, particularly the current lateral acceleration of the aircraft, the current roll rate of the aircraft, the current angle of sideslip of the aircraft.

In this case, the flight control device can determine the actuating commands for the spoiler and/or the regulating flap by means of the formula $$F_1 \cdot \omega_z + F_2 \cdot \omega_x + F_3 \cdot n_y + F_4 \cdot \beta$$

wherein the respective summands depend on which influencing variables are used for the actuating commands of the spoiler and/or of the regulating flap. In this case, the symbols used in the formula are defined as follows:
$\omega_z$ is the yaw rate of the aircraft,
$n_y$ is the current lateral acceleration of the aircraft,
$\omega_x$ is the current roll rate of the aircraft, and
$\beta$ is the current angle of sideslip of the aircraft.

The parameters $F_1 \cdot \omega_z + F_2 \cdot \omega_x + F_3 \cdot n_y + F_4 \cdot \beta$ may respectively differ in the determination of the actuating commands for the spoiler and the regulating flap.

In an embodiment of the method, it is proposed to determine the actuating motion deflection of the spoiler and of the regulating flap as a function of the yaw rate and at least one of the following flight attitude variables: the current lateral acceleration of the aircraft, the current roll rates of the aircraft, the current angle of yaw of the aircraft.

In an embodiment of the method, it is proposed that, in order to reduce the side slipping oscillation and to achieve side slipping oscillation damping, the step of comparing the characteristics of the detected yaw oscillation with target specifications and the step of generating an actuating command for the spoiler adjustment drive and the regulating flap adjustment drive are additionally realized by:
  comparing lateral control commands executed with a lateral control input device that is actuated, in particular, by a pilot with target specifications in order to identify a predetermined characteristic of the lateral control command and, optionally, generating a logical lateral control command confirmation signal based on the identification of the predetermined characteristic of the lateral control command, wherein the predetermined characteristic of the lateral control command is defined in such a way that a multiple change of the adjusting direction of the lateral control takes place in an adjustment period with a minimum value of the lateral control command such that the adjusting directions respectively alternate for successive lateral control commands, and
  generating an actuating command for the deflection of at least one spoiler in dependence on the respectively detected lateral control command, as well as transmitting the actuating command to a spoiler adjustment drive of the at least one spoiler in order to realize the deflection thereof and transmission to this adjustment drive, and generating an actuating command for the deflection of at least one regulating flap in dependence on the respectively detected lateral control command, as well as transmitting the actuating command to the regulating flap adjustment drive, namely based on the identification of the predetermined characteristic of the lateral control command and, if applicable, the presence of the logical lateral control command confirmation signal, wherein the motion of the spoiler being adjusted and the motion of the regulating flap of the same airfoil deflect in mutually opposite directions in a time segment, and wherein the spoiler and the regulating flap are adjusted on the airfoil, on which the adjusted deflections counteract the respectively occurring yawing motion.

According to an embodiment of the method, it is proposed to carry out the step of comparing the characteristics of the detected side slipping oscillation with target specifications and the step of generating an actuating command for the spoiler adjustment drive and the regulating flap adjustment drive when the following conditions are fulfilled, in particular, in addition to the at least one confirmation signal:

the aircraft speed $V_{CAS}$ determined during the method, i.e., the "Calibrated Airspeed," exceeds a speed threshold that lies in the range between 180 and 220 knots and/or the flight altitude is greater than an altitude threshold value that lies in the range between 200 and 400 m.

According to further embodiments of the invention, a method for influencing the directional stability of an aircraft is proposed, wherein said method is based, in particular, on the following steps:

generating lateral control commands based on lateral control inputs that are realized by actuating a lateral control input device and serve for adjusting a rudder of the aircraft or based on an automatic flight path control system with adjustment of a rudder of the aircraft, generating control specifications for the flight path control of the aircraft and detecting yawing motions and, in particular, yaw oscillations of the aircraft that occur due to the adjustment of a rudder of the aircraft.

In this embodiment of the method, it is proposed to carry out the following steps, in particular, in order to realize Dutch roll damping:

comparing the lateral control commands executed with the lateral control input device with target specifications in order to recognize a predetermined characteristic of the lateral control command and, optionally, generating a logical lateral control command confirmation signal upon identification of the predetermined characteristic of the lateral control command on the basis of the comparison, wherein the predetermined characteristic of the lateral control command is defined in such a way that a multiple change of the adjusting direction of the lateral control takes place in an adjustment period with a minimum value of the lateral control command such that the adjusting directions respectively alternate for successive lateral control commands, and generating and transmitting an actuating command for the spoiler adjustment drive of at least one spoiler in order to realize the deflection thereof, as well as an actuating command for the regulating flap adjustment drive of at least one regulating flap (A) in order to realize the deflection thereof, upon identification of the predetermined characteristic of the lateral control command on the basis of the comparison and, if applicable, the presence of the logical lateral control command confirmation signal in order to counteract the yawing motion and, in particular, the yaw rate of the aircraft with the identified characteristic.

In this case, it would be possible, in particular, that an adjustment of a spoiler adjustment drive of a spoiler and of a regulating flap adjustment drive of a regulating flap of the same respective airfoil takes place in a time segment based on the identification of the predetermined characteristic of the lateral control command in such a way that the motion of the spoiler being adjusted and the motion of the regulating flap of the same airfoil deflect in mutually opposite directions in the time segment, wherein the spoiler and the regulating flap are adjusted on the airfoil, on which the adjusted deflections counteract the yawing motion and, in particular, the yaw rate of the aircraft with the identified characteristic.

In this case, the lateral control commands are generated by a lateral control input device that is actuated by a pilot. The optionally provided automatic flight path control system is designed, in particular, such that it generates commands for actuating the rudder and other regulating flaps based on target flight path specifications in order to control the aircraft in accordance with the target flight path specifications.

In an embodiment of the method, it is proposed to define the predetermined characteristic of the lateral control command for generating the logical lateral control command confirmation signal in that the time period, in which an adjustment of the lateral control input device, i.e., particularly an actuation thereof, respectively takes place in one of two actuating directions or in which the lateral control commands generated by this lateral control input device occur, exceeds at least a minimum time period, at least three successive lateral control commands with changing adjusting directions and with a respective minimum value of the lateral control command are present, the minimum value of the lateral control command amounts to at least 25% of the maximum deflection of the lateral control input device.

It is proposed to specify the minimum time period for detecting a predetermined characteristic of the lateral control command in the range between 1 and 6 seconds, particularly for a transport aircraft, i.e., particularly also for an airliner or an airfreighter. The time period may alternatively or additionally be specified in such a way that it amounts to at least double the periodic time of the side slipping oscillation of the fully loaded flexible aircraft in the cruising mode. This time period concerns the time period, in which the pilot actuates the lateral control input device in one of the two actuating directions.

In an embodiment of the method, it is proposed to determine the actuating commands for the spoiler adjustment drive and the regulating flap adjustment drive generated by the adjustment function in the presence of the logical lateral control command confirmation signal in dependence on the respectively detected lateral control command, wherein the adjustment function is realized, in particular, in such a way that it transmits the determined actuating commands to the spoiler adjustment drive and to the regulating flap adjustment drive no earlier than after the second of the successive lateral control commands with changing adjusting directions and with the respective minimum value of the lateral control command. In this case, the generated actuating commands are transmitted, in particular, to the spoiler adjustment drive and to the regulating flap adjustment drive at such a time that the adjustment of the spoiler adjustment drive and of the regulating flap adjustment drive respectively takes place during the adjustment of the detected lateral control command in one respective adjusting direction and is realized in such a way that the motion of the spoiler being adjusted and of the regulating flap aerodynamically counteracts the motion of the rudder actuated due to the at least second lateral control command.

In an embodiment of the method, it is proposed that the lateral motion adjusting device features control pedals in the cockpit in order to actuate a rudder.

In an embodiment of the method, it is generally possible that the determination of the at least one actuating command generated by the adjustment function takes place in functional dependence on one of the following variables: dynamic pressure, Mach number, flight altitude, mass state of the aircraft.

In an embodiment of the method, it would generally also be possible to realize the side slipping oscillation damping function in such a way that, in the presence of the logical yaw rate confirmation signal and/or the logical lateral actuation confirmation signal, it generates actuating commands for a spoiler of an airfoil and for a regulating flap of the same airfoil in dependence on the respectively detected yaw rate and transmits these actuating commands to the corresponding adjustment drives in such a way that the spoiler is extended in the direction of the vertical axis of the aircraft and the regulating flap is adjusted opposite to the vertical axis of the aircraft, wherein the adjustment of the spoiler and the regulating flap is carried out on the airfoil, on which an increase of the drag feeds back the detected yaw rate.

In an embodiment of the method, it is proposed to realize the Dutch roll damping function in such a way that, in the presence of the logical yaw rate confirmation signal and/or the logical lateral actuation confirmation signal, it simultaneously generates at least at certain times an actuating command for the adjustment drive of at least one spoiler in order to realize the deflection thereof and transmits the actuating command to this adjustment drive, as well as an actuating command for the adjustment drive of at least one aileron in order to realize the deflection thereof and transmits the actuating command to this adjustment drive, namely in dependence on the respectively detected yaw rate, wherein the actuating commands are specified in such a way that the yaw rate is reduced.

In an embodiment of the method, it is proposed that at least one of the regulating flaps that are arranged on each airfoil and can be adjusted in two directions from a neutral position is an aileron.

In an embodiment of the method, it is proposed to arrange several regulating flaps that can be adjusted in two directions from a neutral position on each airfoil and to realize the Dutch roll damping function in such a way that, in the presence of the logical yaw rate confirmation signal and/or the logical lateral actuation confirmation signal, it generates an actuating command for the adjustment drive of at least the regulating flap arranged closest to the end of the respective wing in dependence on the respectively detected yaw rate in order to realize the deflection of this regulating flap, wherein the actuating command is transmitted to the adjustment drive assigned to said regulating flap.

In an embodiment of the method, it is proposed to arrange several spoilers on each airfoil and to realize the side slipping oscillation damping function in such a way that, in the presence of the logical yaw rate confirmation signal and/or the logical lateral actuation confirmation signal, it generates an actuating command for the adjustment drive of at least the spoiler arranged closest to the end of the respective wing in dependence on the respectively detected yaw rate in order to realize the deflection of this spoiler, wherein the actuating command is transmitted to the adjustment drive assigned to said spoiler.

In an embodiment of the method, it would be possible, in particular, that the value of the adjusted deflection of the control surfaces is functionally dependent on the respectively occurring yaw rate, wherein the function with a higher yaw rate respectively results in a greater deflection of the control surfaces.

According to further embodiments of the invention, a method for influencing the directional stability of an aircraft is proposed and features the following steps:

monitoring the control system of the aircraft for the presence of a fault in the actuation system of the rudder of the aircraft by determining deviations of an actuating command for the adjustment drive of the rudder adjusted by the flight control device of the aircraft from the respective actual position of the rudder and generating a logical fault state confirmation signal if one of the deviations exceeds a predetermined limiting value, and adjusting a fall-back operating mode in the flight control device of the aircraft in the presence of the logical fault state confirmation signal, wherein the directional stability is not influenced by generating actuating commands for the adjustment drive of the rudder in this mode, but rather by generating and transmitting at least one actuating command for the spoiler adjustment drive of at least one spoiler on one of the airfoils in order to realize the deflection thereof, as well as an actuating command for the regulating flap adjustment drive of at least one regulating flap on the same airfoil in order to realize the deflection thereof in a direction that extends opposite to the deflection of the spoiler, wherein the actuating commands for influencing the directional stability are specified in such a way that the aircraft seeks a yaw rate to be adjusted in order to influence the directional stability.

It would be possible, in particular, that the recognition of a fault in the actuation system and the generation of a logical fault state confirmation signal take place if the flight control device has detected blocking of the rudder and/or oscillating in the servo loop of the actuator of the rudder of the aircraft. It would furthermore be possible that these fault states are recognized by the flight control device of the aircraft based on deviations of adjusted actuating commands for the adjustment drive of the rudder from the respective actual position of the rudder, particularly an exceedance of a predetermined limiting value by one of the deviations and the generation of a logical fault state confirmation signal.

In another embodiment, the rudder is only switched off or switched inactive at certain times while the method is carried out (this would not be done intentionally, but may occur as a consequence of faults in the system). In this embodiment of the method, it would be optionally possible to display a warning for the pilot on a pilot interface in the cockpit, particularly on a pilot display, when the rudder is switched inactive or switched inactive at certain times in order to indicate to the pilot that the rudder is switched inactive or switched inactive at certain times.

In the embodiments and aspects of the method, it would generally be possible to simultaneously generate at least at certain times an actuating command for the adjustment drive of at least one spoiler in order to realize an upward deflection thereof, i.e., in the direction of the vertical axis, and to transmit the actuating command to this adjustment drive, as well as an actuating command for the adjustment drive of at least one aileron in order to realize a downward deflection thereof and to transmit the actuating command to this adjustment drive, namely in dependence on the respectively detected yaw rate, wherein the actuating commands are specified in such a way that the yaw rate is reduced.

In the embodiments and aspects of the method, it would generally be possible that at least one of the regulating flaps that are arranged on each airfoil and can be adjusted in two directions from a neutral position is an aileron.

According to various embodiments of the invention, it is proposed, in particular, to implement the step of comparing the characteristics of the detected Dutch roll with target specifications and the step of generating an actuating command for the spoiler adjustment drive and for the regulating flap adjustment drive as functions of the flight control device in the methods according to various embodiments of the invention.

According to further embodiments of the invention, a computer program product is proposed that causes a program-controlled device to carry out an embodiment of the method.

According to further embodiments of the invention, an aircraft is proposed that features the following: airfoils with at least one respective regulating flap that can be adjusted in two directions from a neutral position and at least one spoiler, a rudder unit with a rudder, as well as a directional stabilization device for carrying out an embodiment of the method.

According to a further embodiment of the invention, an aircraft is proposed that features the following: airfoils with at least one respective regulating flap that can be adjusted in two directions from a neutral position and at least one spoiler, a rudder unit with a rudder, as well as a directional stabilization device that features:
- a control input device that enables the pilot to input control specifications for the flight path control of the aircraft,
- a flight control device that is functionally connected to the control input device,
- a sensor unit that is functionally connected to the flight control device and serves for detecting the rotational rates including the yaw rates of the aircraft,
- at least one respective regulating flap adjustment drive for adjusting the regulating flap and at least one respective spoiler adjustment drive for adjusting the spoiler that respectively are functionally connected to the flight control device, wherein the flight control device has a control function that is realized in such a way that it generates actuating commands for the adjustment drives from the control specifications and the rotational rates and transmits said actuating commands to the adjustment drives in order to control the aircraft. The control function has a function for the lateral stabilization of the aircraft and, in particular, a Dutch roll damping function, by means of which one or more of the embodiments of the method described herein are implemented.

According to an embodiment, the control function features:
- a comparison function that serves for comparing the characteristics of the detected side slipping oscillation with target specifications in order to recognize at least one predetermined characteristic of side slippings oscillations and generates a logical side slipping oscillation confirmation signal in this case, and
- an adjustment function that is realized in such a way that, in the presence of the logical yaw rate confirmation signal, it generates an actuating command for the spoiler adjustment drive of at least one spoiler in order to realize the deflection thereof and transmits the actuating command to this adjustment drive, as well as an actuating command for the regulating flap adjustment drive of at least one regulating flap in order to realize the deflection thereof and transmits the actuating command to this adjustment drive, namely based on the respectively detected Dutch roll, wherein the actuating commands are specified in such a way that the Dutch roll of the aircraft is reduced.

According to an embodiment of the aircraft, it is proposed to realize the side slipping oscillation damping function in such a way that the predetermined characteristic of the respectively detected side slipping oscillation is defined by a predetermined limiting value for the detected yaw rate of the side slipping oscillation, and that the comparison function generates a logical side slipping oscillation confirmation signal if it determines that the detected yaw rate exceeds the predetermined limiting value, wherein it is proposed, in particular, that the limiting value amounts to more than 3 degrees per second.

According to an embodiment of the aircraft, it is alternatively or additionally proposed to realize the side slipping oscillation damping function in such a way that the predetermined characteristic of the respectively detected side slipping oscillation is defined by a predetermined limiting value for the respectively detected yaw rate and a limiting value for the minimum time period of an exceedance of the limiting value by the yaw rate in one respective direction, and that the comparison function generates a logical side slipping oscillation confirmation signal if it determines that the detected yaw rate exceeds the predetermined limiting value for the yaw rate and the predetermined limiting value for the time period, wherein it is proposed, in particular, that the limiting value amounts to more than 3 degrees per second and the limiting value for the minimum time period amounts to more than one second.

According to an embodiment of the aircraft, it is proposed to realize the adjustment function in such a way that, in the presence of the logical yaw rate confirmation signal, it determines at least one actuating command for the spoiler adjustment drive and at least one actuating command for the regulating flap adjustment drive with respect to its value and its time history in dependence on the respectively detected yaw rate and/or the time period of the exceedance of the limiting value by the yaw rate, wherein the at least one actuating command is specified in such a way that the side slipping oscillation of the aircraft is reduced, wherein particularly the at least one actuating command of the adjustment function is defined with respect to its time for the spoiler adjustment drive and the regulating flap adjustment drive in such a way that the adjustment of the spoiler adjustment drive and of the regulating flap adjustment drive respectively takes place during the adjustment of the detected side slipping oscillation in one respective side slipping oscillation direction and is realized in such a way that the motion of the spoiler being adjusted and of the regulating flap aerodynamically counteracts the respective direction of the side slipping oscillation According to an embodiment of the aircraft, it is proposed that the Dutch roll damping function features:
- a comparison function that serves for comparing the lateral control commands executed with the lateral control input device with target specifications in order to recognize a predetermined characteristic of the lateral control command and generates a logical lateral control command confirmation signal in this case, wherein the predetermined characteristic of the lateral control command is defined in such a way that a multiple change of the adjusting direction of the lateral control takes place in an adjustment period with a minimum value of the lateral control command such that the adjusting directions respectively alternate for successive lateral control commands, and an adjustment function that is realized in such a way that, in the presence of the logical lateral control command confirmation signal, it generates an actuating command for the spoiler adjustment drive of at least one spoiler (S) in order to realize the deflection thereof and transmits the actuating command to this adjustment drive, as well as an actuating command for the regulating flap adjustment drive of at least one regulating flap (A) in order to realize the deflection thereof and transmits the actuating command to this adjustment drive, namely in dependence on the respectively detected lateral control command, wherein the regulating flap is arranged on the same airfoil as the respective spoiler (S) being adjusted in at least one sub-function of the adjustment function, and wherein the actuating commands are specified in such a way that the yaw rate of the aircraft is reduced.

According to another embodiment of the invention, an aircraft is proposed that features the following: airfoils with at least one respective regulating flap that can be adjusted in two directions from a neutral position and at least one spoiler, a rudder unit with a rudder, as well as a directional stabilization device that features:

a control input device that enables the pilot to input control specifications for the flight path control of the aircraft, as well as a sensor unit that is functionally connected to the control input device and serves for detecting control inputs, wherein the control input device features a lateral control input device for actuating a rudder of the aircraft, a flight control device that is connected to the control input device, a sensor unit that is functionally connected to the flight control device and serves for detecting the rotational rates including the yaw rates of the aircraft, at least one respective regulating flap adjustment drive for adjusting the regulating flap and at least one respective spoiler adjustment drive for adjusting the spoiler that respectively are functionally connected to the flight control device, wherein the flight control device has a control function that is realized in such a way that it generates actuating commands for the adjustment drives from the control specifications and the rotational rates and transmits said actuating commands to the adjustment drives in order to control the aircraft, wherein the control function has a side slipping oscillation damping function that features:

a comparison function that serves for comparing the lateral control commands executed with the lateral control input device with target specifications in order to recognize a predetermined characteristic of the lateral control command and generates a logical lateral control command confirmation signal in this case, wherein the predetermined characteristic of the lateral control command is defined in such a way that a multiple change of the adjusting direction of the lateral control takes place in an adjustment period with a minimum value of the lateral control command such that the adjusting directions respectively alternate for successive lateral control commands, and an adjustment function that is realized in such a way that, in the presence of the logical lateral control command confirmation signal, it generates an actuating command for the spoiler adjustment drive of at least one spoiler in order to realize the deflection thereof and transmits the actuating command to this adjustment drive, as well as an actuating command for the regulating flap adjustment drive of at least one regulating flap in order to realize the deflection thereof and transmits the actuating command to this adjustment drive, namely in dependence on the respectively detected lateral control command, wherein the actuating commands are specified in such a way that the yaw rate of the aircraft is reduced.

According to an embodiment of the aircraft, it is proposed to define the predetermined characteristic of the lateral control command for generating the logical lateral control command confirmation signal in that the time period, in which an adjustment of the lateral control input device, i.e., particularly an actuation thereof, respectively takes place in one of two actuating directions or in which the lateral control commands generated by this lateral control input device occur, exceeds at least a minimum time period, at least three successive lateral control commands with changing adjusting directions and with a respective minimum value of the lateral control command are present, the minimum value of the lateral control command amounts to at least 25% of the maximum deflection of the lateral control input device.

It is proposed to specify the minimum time period for detecting a predetermined characteristic of the lateral control command in the range between 1 and 6 seconds, particularly for a transport aircraft, i.e., particularly also for an airliner or an airfreighter. The time period may alternatively or additionally be specified in such a way that it amounts to at least double the period of the side slipping oscillation of the fully loaded flexible aircraft in the cruising mode. This time period concerns the time period, in which the pilot actuates the lateral control input device in one of the two actuating directions.

According to an embodiment of the aircraft, it is proposed to determine the actuating commands for the spoiler adjustment drive and the regulating flap adjustment drive generated by the adjustment function in the presence of the logical lateral control command confirmation signal in dependence on the respectively detected lateral control command, wherein the adjustment function is realized, in particular, in such a way that it transmits the determined actuating commands to the spoiler adjustment drive and to the regulating flap adjustment drive no earlier than after the second of the successive lateral control commands with changing adjusting directions and with the respective minimum value of the lateral control command, namely at such a time that the adjustment of the spoiler adjustment drive and of the regulating flap adjustment drive respectively takes place during the adjustment of the detected lateral control command in one respective adjusting direction and is realized in such a way that the motion of the spoiler being adjusted and of the regulating flap aerodynamically counteracts the motion of the actuated rudder.

According to an embodiment of the aircraft, it is proposed that the lateral motion adjusting device features control pedals in the cockpit in order to actuate a rudder.

According to an embodiment of the aircraft, it is proposed to carry out the determination of the at least one actuating command generated by the adjustment function in functional dependence on one of the following variables: dynamic pressure, Mach number, flight altitude, mass state of the aircraft.

According to an embodiment of the aircraft, it is proposed to realize the side slipping oscillation damping function in such a way that, in the presence of the logical yaw rate confirmation signal and/or the logical lateral actuation confirmation signal, it generates actuating commands for a spoiler of an airfoil and for a regulating flap of the same airfoil in dependence on the respectively detected yaw rate upon detection of a predetermined characteristic of a detected yaw rate and transmits these actuating commands to the corresponding adjustment drives in order to dampen the respectively detected yaw rate of the aircraft with predetermined characteristics, wherein the actuating commands are realized in such a way that the spoiler of an airfoil is upwardly extended referred to the direction of the vertical axis of the aircraft with its outer edge that lies near the trailing edge of the wing and the regulating flap is downwardly adjusted opposite to the vertical axis of the aircraft with its outer edge that lies near the trailing edge of the wing, and wherein the adjustment of the spoiler and of the regulating flap is carried out on the airfoil, on which an increase of the drag feeds back the detected yaw rate.

According to an embodiment of the aircraft, it is proposed to realize the side slipping oscillation damping function in such a way that, in the presence of the logical yaw rate confirmation signal and/or the logical lateral actuation confirmation signal, it simultaneously generates at least at certain times an actuating command for the adjustment drive of at least one spoiler in order to realize the deflection thereof and transmits the actuating command to this adjustment drive, as well as an actuating command for the adjustment drive of at least one aileron in order to realize the deflection thereof and transmits the actuating command to this adjustment drive, namely in dependence on the respectively detected yaw rate, in order to dampen the respectively occurring yaw rates of the aircraft with predetermined characteristics, wherein the actuating commands are specified in such a way that the yaw rate is reduced.

According to an embodiment of the aircraft, it is proposed that at least one of the regulating flaps that are arranged on each airfoil and can be adjusted in two directions from a neutral position is an aileron.

According to an embodiment of the aircraft, it is proposed to arrange several regulating flaps that can be adjusted in two directions from a neutral position on each airfoil and to realize the side slipping oscillation damping function in such a way that, in the presence of the logical yaw rate confirmation signal and/or the logical lateral actuation confirmation signal, it generates an actuating command for the adjustment drive of at least the regulating flap arranged closest to the end of the respective wing in dependence on the respectively detected yaw rate in order to realize the deflection of this regulating flap, wherein the actuating command is transmitted to the adjustment drive assigned to said regulating flap in order to dampen the respectively occurring yaw rates of the aircraft with predetermined characteristics.

According to an embodiment of the aircraft, it is proposed to arrange several spoilers on each airfoil and to realize the side slipping oscillation damping function in such a way that, in the presence of the logical yaw rate confirmation signal and/or the logical lateral actuation confirmation signal, it generates an actuating command for the adjustment drive of at least the spoiler arranged closest to the end of the respective wing in dependence on the respectively detected yaw rate in order to realize the deflection of this spoiler, wherein the actuating command is transmitted to the adjustment drive assigned to said spoiler in order to dampen the respectively occurring yaw rates of the aircraft with predetermined characteristics.

According to an embodiment of the aircraft, it is proposed to realize the side slipping oscillation damping function in such a way that the predetermined characteristics of the respectively detected yaw rate are defined by a predetermined limiting value for the detected yaw rate, and that the side slipping oscillation damping function adjusts the at least one spoiler and the at least one regulating flap in dependence on the respectively detected yaw rate if it determines that the detected yaw rate exceeds a predetermined limiting value, wherein it is proposed, in particular, that the limiting value amounts to more than 3 degrees per second.

According to an embodiment of the aircraft, it is proposed to realize the side slipping oscillation damping function in such a way that the predetermined characteristics of the respectively detected yaw rate are defined by a predetermined limiting value for the detected yaw rate, and that the Dutch roll damping function adjusts the at least one spoiler and the at least one regulating flap in dependence on the respectively detected yaw rate if it determines that the detected yaw rate exists in one direction over a minimum time period.

BRIEF DESCRIPTION OF THE DRAWINGS

Example embodiments of the invention are described below with reference to the attached figures, in which.

DESCRIPTION

Figure 1:
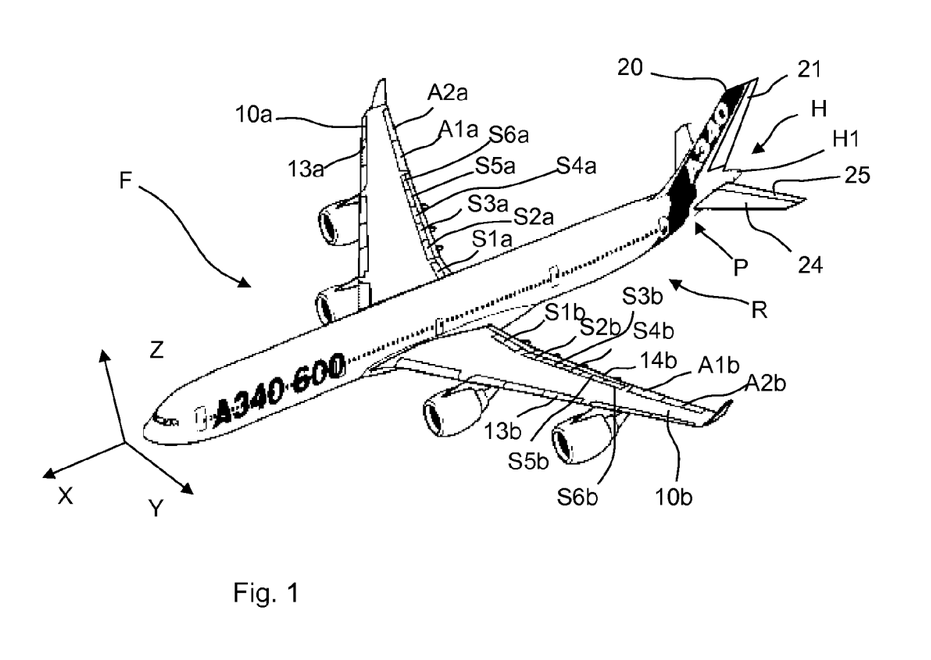
FIG. 1 shows a perspective representation of an aircraft with an illustration of the location, at which the rear flaps provided in accordance with various embodiments of the invention are arranged.

FIG. 1 shows an example embodiment of a controlled aircraft F with two airfoils 10*a*, 10*b*. The airfoils 10*a*, 10*b* particularly feature: at least two respective regulating flaps A that can be adjusted in two directions from a neutral position and are realized in the form of ailerons A1*a*, A2*a* and A1*b*, A2*b* and a respective plurality of spoilers S1*a*, S2*a*, S3*a*, S4*a*, S5*a*, S6*a* and S1*b*, S2*b*, S3*b*, S4*b*, S5*b*, S6*b*. In addition, slats 13*a*, 13*b* and trailing edge flaps 14*a*, 14*b*, a rudder unit 20 with a rudder 21 and an elevator unit 24 with at least one respective elevator 25 are indicated on the aircraft shown. A coordinate system referred to the aircraft F with a longitudinal aircraft axis X, a lateral aircraft axis Y and a vertical aircraft axis Z is furthermore illustrated in FIG. 1.

The aircraft F may also have a different shape than the aircraft F illustrated in FIG. 1. For example, the aircraft may also consist of a high-wing monoplane or a flying wing. The aircraft may also be an aircraft that features canards instead of an elevator unit.

The device for influencing the directional stability of the aircraft F provided in accordance with an embodiment of the invention features a control input device 30 (FIG. 2) for inputting control specifications for the flight path control of the aircraft, as well as a flight control device 50 that is functionally connected to the control input device. The control input device may feature, in particular, pilot input means such as a joystick and optionally also pedals.

Figure 2:
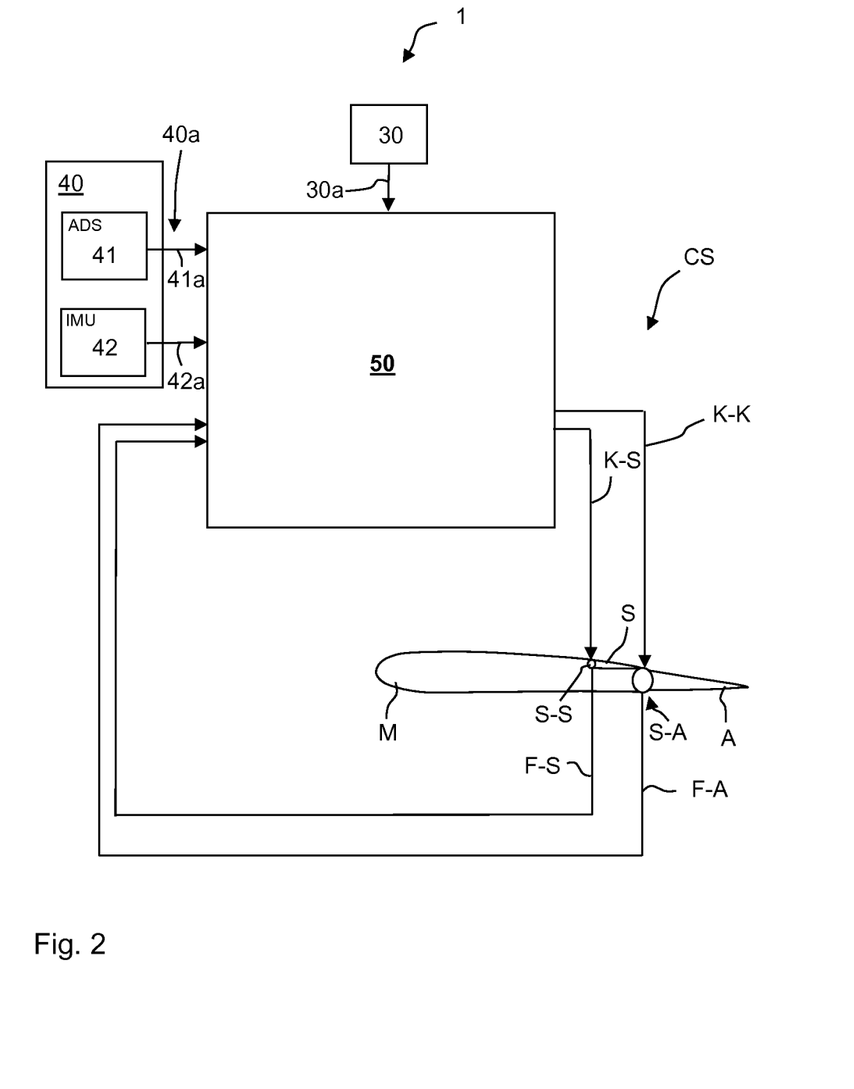
FIG. 2 shows a functional representation of the directional stabilization device provided in accordance with various embodiments of the invention.

The aircraft F features a flight control device 50 and furthermore a control input device or specification device 30 that is functionally connected to the flight control device 50 and a sensor unit, particularly a flight attitude sensor unit 40, for detecting the rotational rates including the yaw rates of the aircraft.

The flight attitude sensor unit 40 may be realized, in particular, with an air data sensor system 41 (Air Data System, ADS) that detects flight attitude data for determining the flight attitude, as well as an attitude sensor or an inertial sensor 42 (Inertial Measurement Unit, IMU) for detecting the flight attitude of the aircraft F and the rotational rates, particularly the yaw rates, of the aircraft F. The air data sensor system 41 features air data sensors for determining the flight attitude of the aircraft F and, in particular, the dynamic pressure, the static pressure and the temperature of the air flowing around the aircraft F. The attitude sensor 42 serves, in particular, for determining rotational rates of the aircraft F including the yaw rates and the roll rates of the aircraft in order to determine the flight attitude thereof.

The flight control device 50 receives the flight attitude sensor signals 40a of the sensor values detected by the flight attitude sensor unit 40, particularly the air data sensor signals 41a of the air data sensor system 41 and the attitude sensor data 42a of the attitude sensor 42. For this purpose, the flight control device 50 features a receiver for receiving the sensor values that were detected by the sensors 40, 41, 42 and need to be transmitted to the flight control device 50.

The control function of the flight control device 50 is realized, in particular, in such a way that it receives control commands from the control input device 30 and sensor values 40a from the sensor unit 40, particularly rotational rates detected by this sensor unit. The control function 50 is realized in such a way that it generates actuating commands for the adjustment drives in dependence on the control commands and the detected and received rotational rates and transmits the actuating commands to these adjustment drives such that the aircraft F is controlled in accordance with the control commands due to the actuation of the adjustment drives. The adjustment drives or adjustment drive units or the drives of the spoilers S and/or the flaps A may be realized in the form of hydraulic or electric drives that are provided with their input power by a corresponding supply system and actuated based on the actuating commands or actuating signals generated by the control device 50 in order to move the spoilers S and/or the flaps A.

The control device or actuating device 50 determines current actuating commands or a current actuating signal vector CS, particularly in the form of an actuating signal vector, for adjustment drives of the control flaps of the aircraft, particularly the regulating flap A and the spoiler, based on the target specifications 30a of the specification device 30 and, optionally, the sensor signals 40a of the flight attitude sensor unit 40. The target specifications 30a in the form of input signals of the actuation device C may correspond to a nominal state of lift, a nominal angle of attack, a nominal glide angle, an aerodynamic parameter such as the ratio between the coefficient of lift and the coefficient of drag, a nominal acceleration and/or a nominal direction of the aircraft or a combination of these values or be derived from these values or a combination thereof and generally define a nominal state of the aircraft.

The device 1 for directionally stabilizing the aircraft provided in accordance with various embodiments of the invention particularly features:
the control input device 30 for inputting control specifications for the flight path control of the aircraft,
the flight control device 50 that is functionally connected to the control input device,
the sensor unit 40, 42 that is functionally connected to the flight control device 50 and serves for detecting the rotational rates including the yaw rates of the aircraft F,
at least one respective regulating flap adjustment drive for adjusting the regulating flap A and at least one respective spoiler adjustment drive for adjusting the spoilers that respectively are functionally connected to the flight control device 50, wherein the flight control device 50 has a control function that is realized in such a way that it generates actuating commands CS for the adjustment drives from the control specifications 30a and the rotational rates 42a and transmits the actuating commands to these adjustment drives in order to control the aircraft.

The control function furthermore has, in particular, a Dutch roll damping function that is composed of:
a comparison function that serves for comparing the characteristics of the detected Dutch roll with target specifications in order to recognize at least one predetermined characteristic of side slipping oscillations and generates a logical side slipping oscillation confirmation signal in this case, and
an adjustment function that is realized in such a way that, in the presence of the logical yaw rate confirmation signal, it generates an actuating command for the spoiler adjustment drive of at least one spoiler S in order to realize the deflection thereof and transmits the actuating command to this adjustment drive, as well as an actuating command for the regulating flap adjustment drive of at least one regulating flap A in order to realize the deflection thereof and transmits the actuating command to this adjustment drive, namely based on the respectively detected side slipping oscillation, wherein the actuating commands are specified in such a way that the side slipping oscillation of the aircraft is reduced.

An embodiment of the aircraft may feature, in particular, a sensor unit for detecting control inputs that is functionally connected to the control input device 30, wherein the control input device 30 features a lateral control input device for actuating a rudder of the aircraft. This embodiment of the invention may have, in particular, a side slipping oscillation damping function that features:
a comparison function that serves for comparing the lateral control commands executed with the lateral control input device with target specifications in order to recognize a predetermined characteristic of the lateral control command and generates a logical lateral control command confirmation signal in this case, wherein the predetermined characteristic of the lateral control command is defined in such a way that a multiple change of the adjusting direction of the lateral control takes place in an adjustment period with a minimum value of the lateral control command such that the adjusting directions respectively alternate for successive lateral control commands, and
an adjustment function that is realized in such a way that, in the presence of the logical lateral control command confirmation signal, it generates an actuating command for the spoiler adjustment drive of at least one spoiler S in order to realize the deflection thereof and transmits the actuating command to this adjustment drive, as well as an actuating command for the regulating flap adjustment drive of at least one regulating flap (A) in order to realize the deflection thereof and transmits the actuating command to this adjustment drive, namely in dependence on the respectively detected lateral control command, wherein the actuating commands are specified in such a way that the yaw rate of the aircraft is reduced.

The flight control device 50 is generally realized in such a way that it generates current input signals or a current input signal vector CS for adjusting the actuators of the regulating flaps, e.g., the spoilers and the ailerons, based on the target specifications 30a such that the aircraft assumes a nominal state that corresponds to the target specifications 30a. The flight control device 50 features, in particular, a side slipping oscillation damping function for reducing the respectively detected yaw rates or side slipping oscillations. This side slipping oscillation damping function particularly features:

a comparison function for comparing the characteristics of the detected yaw rates with target specifications in order to recognize predetermined characteristics of yaw rates, and an adjustment function that is realized in such a way that it generates an actuating command for the spoiler adjustment drive of at least one spoiler S in order to realize the deflection thereof and transmits the actuating command to this adjustment drive, as well as an actuating command for the regulating flap adjustment drive of at least one regulating flap A in order to realize the deflection thereof and transmits the actuating command to this adjustment drive, namely in dependence on the respectively detected yaw rate, in order to dampen the respectively occurring yaw rates of the aircraft with predetermined characteristics, wherein the actuating commands are specified in such a way that the yaw rate of the aircraft is reduced.

In an example embodiment, the control device 50 determines the commands for the adjustment drives of the regulating flap A and of the spoiler S, particularly by means of a regulating device. In this case, the control device 50 may be realized, in particular, in such a way that it generates a current actuating command CS or a current actuating signal vector CS for adjusting the adjustment drives S-A, S-S by means of a regulating device or by means of a model for the aircraft or an observation model and transmits the actuating command or actuating signal vector to the adjustment drives in order to actuate, in particular, the regulating flap A and the spoiler S, wherein the actuation device C determines the current actuating command CS or the current actuating signal vector CS based on the target specifications 30a of the specification device 30 and, optionally, the sensor signals 40a of the flight attitude sensor unit 40. The respective current actuating states and, in particular, the actuating positions of the adjustment drives S-A, S-S are preferably determined by means of corresponding adjustment drive sensors and the sensor signals determined by the adjustment drive sensors are fed back to the control device 50. The respective feedback is indicated with the reference symbols F-S and F-A in FIG. 2. Based on these feedbacks, a control of flight attitudes of the aircraft can be realized, in particular, in the control device 50 and a yaw rate stabilization of the aircraft can be achieved.

According to various embodiments of the invention, the Dutch roll damping function is in this case realized in such a way that, upon detection of a predetermined characteristic of a detected yaw rate or Dutch roll, it generates actuating commands for the spoiler S and for the regulating flap A in dependence on the respectively detected yaw rate and transmits the actuating commands to the corresponding adjustment drives in order to dampen the respectively detected yaw rate or Dutch roll of the aircraft with predetermined characteristics, wherein the actuating commands are realized in such a way that the spoiler S of an airfoil is upwardly extended referred to the vertical aircraft axis Z and the regulating flap is downwardly adjusted referred to the vertical aircraft axis, and wherein the adjustment of the spoiler and of the regulating flap is carried out on the airfoil, on which an increase of the drag feeds back the detected yaw rate.

According to an example embodiment, the control device 50 is realized in such a way that it not only features the side slipping oscillation damping function, but also other damping functions with respect to the other rotational axes of the aircraft that utilize, in particular, the ailerons, the rudder, the elevators and/or the spoilers for compensating deviations of flight attitudes of the aircraft from nominal values.

The side slipping oscillation damping function may, in particular, be realized in such a way that it simultaneously generates at least at certain times an actuating command for the adjustment drive of at least one spoiler S in order to realize the deflection thereof and transmits the actuating command to this adjustment drive, as well as an actuating command for the adjustment drive of at least one regulating flap A, particularly an aileron A1a, A2a, A1b, A2b, in order to realize the deflection thereof and transmits the actuating command to this adjustment drive, namely in dependence on the respectively detected yaw rate, in order to dampen the respectively occurring yaw rates of the aircraft with predetermined characteristics, wherein the actuating commands are specified in such a way that the yaw rate is reduced.

According to various embodiments of the invention, the at least one regulating flap A that is arranged on each airfoil and can be adjusted in two directions from a neutral position preferably is an aileron A1a, A2a, A1b, A2b. In this case, it would be possible, in particular, to realize the Dutch roll damping function in such a way that it generates an actuating command for the adjustment drive of at least the regulating flap A or aileron A2a, A2b arranged closest to the end of the respective wing in dependence on the respectively detected yaw rate in order to realize the deflection of this regulating flap and transmits the actuating command to the adjustment drive assigned to said regulating flap or aileron in order to dampen the respectively occurring yaw rates of the aircraft with predetermined characteristics and/or generates an actuating command for the adjustment drive of at least the spoiler S6a, S6b arranged closest to the end of the respective wing in order to realize the deflection thereof and transmits the actuating command to the adjustment drive assigned to said spoiler. In this case, it would alternatively be possible to adjust the respective outer ailerons A2a, A2b and/or spoilers S6a, S6b with double amplification analogous to the ailerons A2a, A2b or spoilers S6a, S6b that lie father inward.

The at least one predetermined characteristic of the respectively detected yaw rate that serves for recognizing predetermined characteristics of side slipping oscillations or yaw rates in the comparison function of the side slipping oscillation damping function by comparing the characteristics of the detected side slipping oscillations or yaw rates with target specifications may be defined by or ascertainable with a predetermined limiting value in an embodiment of the side slipping oscillation damping function. In this case, it would be possible for the side slipping oscillation damping function to adjust the at least one spoiler and the at least one regulating flap when the side slipping oscillation damping function determines that the detected yaw rate exceeds a predetermined limiting value. This limiting value may, in particular, amount to 3 degrees per second.

In an embodiment of the side slipping oscillation damping function, it may be alternatively or additionally defined by or ascertainable with a predetermined limiting value that the predetermined characteristics of the respectively detected yaw rate are defined by a predetermined limiting value for the respectively detected yaw rate and that the side slipping oscillation damping function adjusts the at least one spoiler and the at least one regulating flap in dependence on the respectively detected yaw rate when it determines that the detected side slipping oscillation or yaw rate exists in one direction over a minimum time period.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for reducing yawing motions of an aircraft in-flight,
   wherein a spoiler adjustment drive of a spoiler and a second regulating flap adjustment drive of a second regulating flap of the same respective airfoil are adjusted in a time segment such that a motion of the spoiler being adjusted and a motion of the second regulating flap of the same airfoil deflect in mutually opposite directions in the time segment,
   identifying a predetermined characteristic of a Dutch Roll by comparing characteristics of yawing motions of the aircraft with target specifications, and
   adjusting the spoiler and the second regulating flap on the same airfoil in mutually opposite directions to counteract the yawing motions of the aircraft.

2. The method of claim 1, wherein the predetermined characteristic of a respectively detected yawing motion is defined by a predetermined limiting value for a respectively detected yaw rate and a limiting value for a minimum time period of an exceedance of the predetermined limiting value by the respectively detected yaw rate in one respective direction, and
   wherein a comparison function identifies the predetermined characteristic of the respectively detected yawing motion if the comparison function determines that the respectively detected yaw rate exceeds the predetermined limiting value for the respectively detected yaw rate and the predetermined limiting value for the minimum time period,
   wherein the predetermined limiting value for the respectively detected yaw rate amounts to more than 3 degrees per second and the limiting value for the minimum time period amounts to more than one second.

3. The method of claim 1, wherein a comparison function identifies the predetermined characteristic of the respectively detected yawing motion if the following function is fulfilled as the predetermined characteristic of the respectively detected yawing motion:

$$\sqrt{\left(\frac{\omega_x}{B_x}\right)^2 + \left(\frac{\omega_z}{B_z}\right)^2} > 1;$$

wherein:
   $\omega_z$ is the current yaw rate of the aircraft,
   $\omega_x$ is the current roll rate of the aircraft,
   $B_x$ is a scaling factor for the current yaw rate $\omega_x$ of the aircraft that lies in the range between 10 degrees/second and 20 degrees/second, and
   $B_z$ is a scaling factor for the current roll rate $\omega_z$ of the aircraft that lies in the range between 10 degrees/second and 20 degrees/second.

4. The method of claim 1, wherein comparing the characteristics of a respectively detected yawing motion with the target specifications and generating an actuating command for the spoiler adjustment drive and the second regulating flap adjustment drive comprise:
   comparing lateral control commands executed with a lateral control input device with target specifications in order to identify a predetermined characteristic of the lateral control commands, wherein the predetermined characteristic of the lateral control commands is defined in such a way that a multiple change of an adjusting direction of lateral control takes place in an adjustment period with a minimum value of the lateral control commands such that the adjusting direction respectively alternates for successive lateral control commands, and
   generating an actuating command for deflection of the spoiler in dependence on the respectively detected lateral control commands and transmitting the actuating command to the spoiler adjustment drive of the spoiler for deflection of the spoiler, as well as generating an actuating command for deflection of the second regulating flap in dependence on the respectively detected lateral control commands and transmitting the actuating command to the second regulating flap adjustment drive based on identification of the predetermined characteristic of the lateral control commands, wherein the spoiler and the second regulating flap are moved in mutually opposite directions on the same airfoil, and wherein the actuating commands are specified in such a way that the respectively detected yawing motion is reduced.

5. The method of claim 1, wherein comparing the characteristics of the detected Dutch roll with the target specifications and generating an actuating command for the spoiler adjustment drive and for the second regulating flap adjustment drive are carried out when at least one of the following conditions are fulfilled:
   an aircraft speed $V_{CAS}$ determined during the method exceeds a speed threshold that lies in a range between 180 and 220 knots and
   a flight altitude is greater than an altitude threshold value that lies in a range between 200 and 400 m.

6. The method of claim 1, further comprising
   comparing lateral control commands generated with a lateral control input device with target specifications in order to recognize a predetermined characteristic of the lateral control commands, wherein the predetermined characteristic of the lateral control commands is defined such that a multiple change of an adjusting direction of lateral control takes place in an adjustment period with a minimum value of the lateral control commands such that adjusting directions respectively alternate for successive lateral control commands, and
   generating and transmitting an actuating command for the spoiler flap adjustment drive of the spoiler for deflection of the spoiler, as well as generating and transmitting an actuating command for the second regulating flap adjustment drive of the second regulating flap for deflection of the second regulating flap to counteract the respectively detected yawing motion and, in particular, a yaw rate of the aircraft with the identified predetermined characteristic.

7. The method of claim 6, wherein the predetermined characteristic of the lateral control commands for generating a logical lateral control command confirmation signal comprises:
   a time period, in which an adjustment of the spoiler adjustment drive and of the second regulating flap adjustment drive respectively takes place, amounts to at least double and no more than a period of the natural oscillations of the aircraft or a periodic time of a side slipping oscillation of the aircraft,
   at least three successive lateral control commands with changing adjusting directions and with a respective minimum value of the lateral control command are present, wherein the respective minimum value of the lateral control commands amounts to at least 25% of a maximum deflection of the lateral control input device.

8. The method of claim 7, wherein a lateral motion adjusting device is formed by control pedals in a cockpit that serve for actuating a rudder.

9. The method of claim 6, wherein actuating commands for the spoiler adjustment drive and for the second regulating flap adjustment drive determined by an adjustment function upon identification of the predetermined characteristic of the lateral control commands are determined in dependence on the respectively detected lateral control commands, and wherein the adjustment function is configured to transmit the determined actuating commands to the spoiler adjustment drive and to the second regulating flap adjustment drive no earlier than after a second of the successive lateral control commands with changing the adjusting directions and with the respective minimum value of the lateral control commands.

10. The method of claim 6, wherein the second regulating flap that is arranged on the respective airfoil and is adjustable in two directions from a neutral position is an aileron.

11. The method of claim 6 further comprising carrying out the method on a program-controlled device.

12. An aircraft comprising: airfoils with at least one respective regulating flap is adjustable in two directions from a neutral position and at least one spoiler, a rudder unit with a rudder, a directional stabilization device, and a flight computer, wherein the flight computer is configured for carrying out the method of claim 6.

13. The method of claim 1, further comprising:
monitoring a control system of the aircraft for a presence of a fault in an actuation system of a rudder of the aircraft by determining deviations of an adjusted actuating command for an adjustment drive of the rudder from a respective actual position of the rudder and generating a logical fault state confirmation signal if one of the deviations exceeds a predetermined limiting value, and adjusting a fall-back operating mode in a flight control device of the aircraft in a presence of the logical fault state confirmation signal, wherein directional stability is influenced by generating and transmitting at least one actuating command for the spoiler adjustment drive of the spoiler on one of the airfoils for deflection of the spoiler, as well as an actuating command for the second regulating flap adjustment drive of the second regulating flap on the same airfoil for deflection of the second regulating flap in a direction that extends opposite to the deflection of the spoiler, wherein the actuating commands for influencing the directional stability are specified such that the aircraft seeks a yaw rate to be adjusted in order to influence the directional stability.

14. The method of claim 13, wherein at least one of the spoiler and the second regulating flap that is arranged on each airfoil and is adjustable in two directions from a neutral position is an aileron.

15. The method of claim 13 further comprising carrying out the method on a program-controlled device.

16. An aircraft comprising: airfoils with at least one respective regulating flap that is adjustable in two directions from a neutral position and the spoiler, a rudder unit with a rudder, a directional stabilization device, and a flight computer, wherein the flight computer is configured for carrying out the method of claim 13.

* * * * *

UNITED STATES PATENT AND TRADEMARK OFFICE
CERTIFICATE OF CORRECTION

| | |
|---|---|
| PATENT NO. | : 9,274,523 B2 |
| APPLICATION NO. | : 13/464029 |
| DATED | : March 1, 2016 |
| INVENTOR(S) | : Hans-Gerd Giesseler |

Page 1 of 1

It is certified that error appears in the above-identified patent and that said Letters Patent is hereby corrected as shown below:

On title page, item 30 Foreign Application Priority Data
Add --May 4, 2011 (DE) 10 2011 100 481.9--

Signed and Sealed this
Fourteenth Day of June, 2016

Michelle K. Lee
*Director of the United States Patent and Trademark Office*